(12) United States Patent
Slaughter et al.

(10) Patent No.: US 6,630,095 B2
(45) Date of Patent: Oct. 7, 2003

(54) METHOD FOR MAKING COMPOSITE STRUCTURES

(75) Inventors: Steve Slaughter, Palmdale, CA (US); John C. Fish, Santa Clarita, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 35 days.

(21) Appl. No.: 09/919,128

(22) Filed: Aug. 1, 2001

(65) Prior Publication Data

US 2003/0025232 A1 Feb. 6, 2003

(51) Int. Cl.$^7$ ................................................ B29C 70/44
(52) U.S. Cl. ...................... 264/510; 264/511; 264/102; 264/255; 264/257; 264/258; 264/324
(58) Field of Search ................................ 264/102, 510, 264/511, 257, 258, 255, 324

(56) References Cited

U.S. PATENT DOCUMENTS

| | | | | |
|---|---|---|---|---|
| 4,902,215 A | * | 2/1990 | Seemann, III | 425/406 |
| 4,942,013 A | * | 7/1990 | Palmer et al. | 264/511 |
| 5,576,030 A | * | 11/1996 | Hooper | 425/112 |
| 6,048,488 A | * | 4/2000 | Fink et al. | 264/510 |
| 6,383,428 B1 | * | 5/2002 | Ellison | 264/108 |
| 6,406,660 B1 | * | 6/2002 | Spurgeon | 264/510 |
| 6,508,974 B1 | * | 1/2003 | Loving | 264/510 |

* cited by examiner

Primary Examiner—Stefan Staicovici

(57) ABSTRACT

A method for fabricating fiber reinforced plastic structures includes a mold surface upon which can be supported a lay-up of one or more layers of a fibrous material, and over which can be placed a fluid impervious outer sheet with an inlet port and having its edges marginally sealed upon the mold surface to form a chamber. A vacuum outlet is connected to the chamber for drawing a vacuum there from. A resin distribution system is positioned between the lay-up and the fluid impervious sheet. The resin distribution system includes a resin distribution medium for receiving resin from the inlet port and a resin containment layer between the resin distribution medium and lay-up for preventing resin flowing from the resin distribution medium into the lay-up until the resin distribution medium is substantially filled with resin.

15 Claims, 2 Drawing Sheets

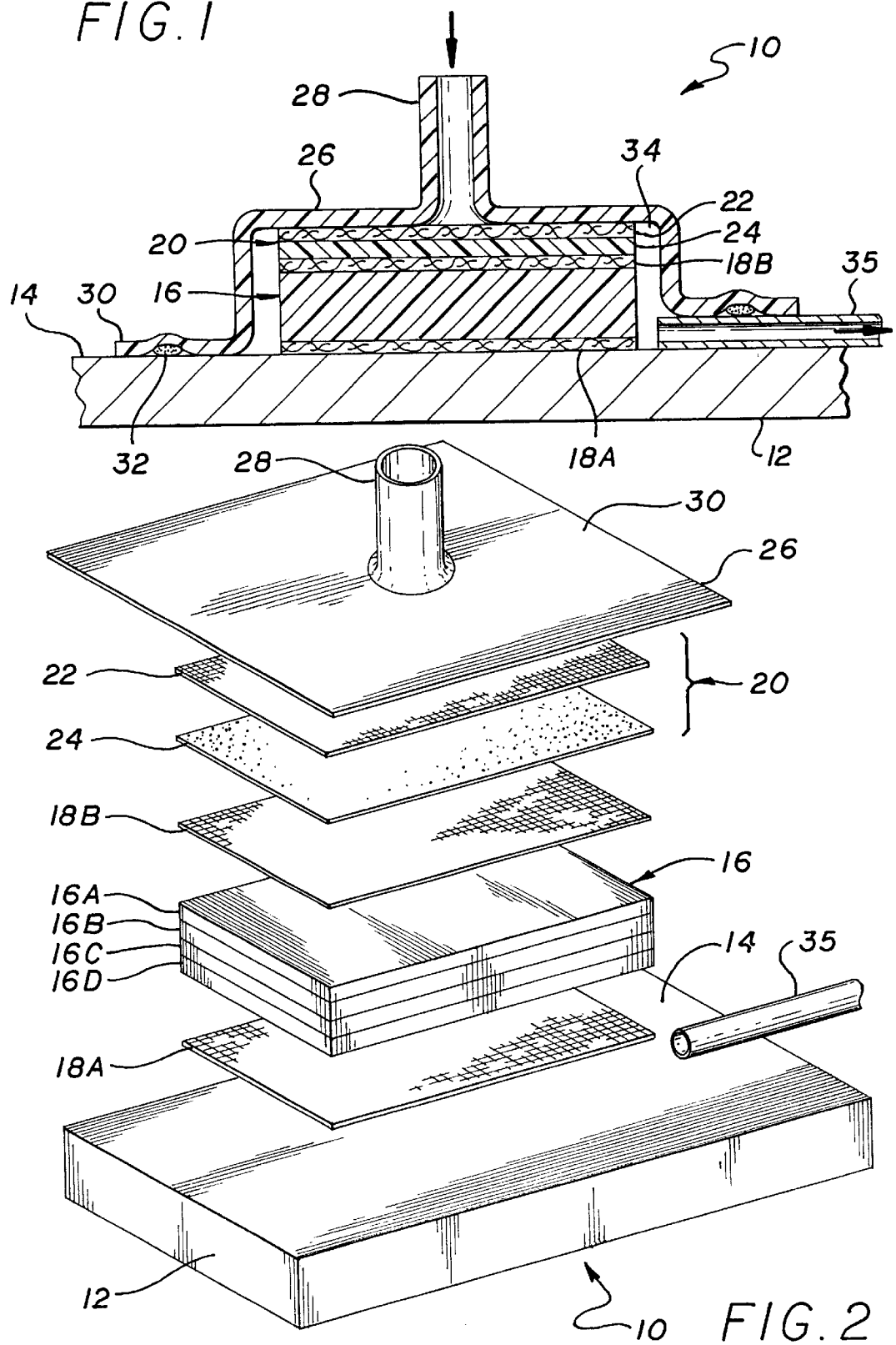

METHOD FOR MAKING COMPOSITE STRUCTURES

BACKGROUND OF THE INVENTION

1. Field of the Invention

The invention relates to the field of composite structure fabrication apparatus for making composite structures using vacuum assisted resin transfer molding techniques. In particular, to an apparatus wherein the resin distribution system controls flow of resin into the lay-up of fibrous material until the distribution medium is substantially filled with resin prior to resin infusion into the lay-up.

2. Description of Related Art

The vacuum assisted resin transfer molding (VARTM) process is old in the art. In general terms a material of any unimpregnated fiber and/or fabric is laid up in layers on top of a mold. A vacuum bag is placed about the lay-up and sealed to the mold. A peel ply may be placed on top of the lay-up and between the layers and mold surface to insure that the vacuum bag can be removed from the completed part and that the part can be removed from the mold. Resin is introduced into the vacuum bag, while a vacuum is drawn from beneath the lay-up. This causes the resin to flow through the lay-up. Thereafter, the resin flow is terminated and the resin in the assembly is cured. This may require that the resin be heated to curing temperature. To insure even distribution of resin into the lay-up, a resin distribution medium is placed on top of the lay-up, which is designed to cause the resin to evenly distribute there across eliminating resin-starved areas.

Many types of resin distribution have been proposed. For example, U.S. Pat. No. 4,132,755 Process for Manufacturing Resin-Impregnated, Reinforced Articles Without The Presence Of Resin Fumes by J. Johnson. Johnson discloses the use of a perforated film between the lay-up and vacuum bag. Resin is fed from the top through the vacuum bag, through the perforated film and into the lay-up. A spring is located at the periphery of the lay-up, but under the perforated film. The spring is coupled to a vacuum line, thus providing a channel such that resin can be more readily transferred into the lay-up. This reference is of interest for disclosing the use of a perforated film and the use of a spring to provide a channel to the perforated film. However, a special perforated film is required and there is still the problem of insuring that the resin reaches all parts of the perforated film. Japanese Patent No. 60-83826 discloses the use of a wire mesh as a distribution median in a vacuum assisted molding process. However, a wire mesh may not necessarily be made to conform to a complex contoured part. Furthermore, a open mesh may allow resin to flow too freely into the lay-up prior to the wire mesh becoming filled with resin, thus filling the lay-up near the inlet tube and creating resin starved area further away from the inlet tube.

U.S. Pat. No. 2,913,036 Process and Apparatus For Molding Large Plastic Structures by G. H. Smith discloses the use of channels placed on the lay-up that act as resin distribution paths and become reinforcements on the finished part. It is unusable on parts that do not require reinforcement.

U.S. Pat. No. 4,902,215 Plastic Transfer Molding Techniques For The Production Of Fiber Reinforced Plastic Structures by W. H. Seemann. In general terms, the design of the distribution medium includes two parts: spaced apart lines and an array of raised pillars. In detail, the distribution medium can be a crisscrossed pattern of mono-filaments with raised segments at the intersection of the mono-filaments; a series of spaced apart strips forming a grid structure; or a knitted cloth with raised segments being areas of increased bulk. A central conduit in the form of a spring is positioned over the peel ply, is in communication with the resin inlet port and acts as a central distribution line. Also of interest is U.S. Pat. No. 5,052,906 Plastic Transfer Molding Apparatus For The Production Of Fiber Reinforced Plastic Structures by W. H. Seemann, which discloses the use of the distribution mediums disclosed in the '215 patent on either side of the lay-up. These distribution mediums are specialized products and may unduly raise fabrication costs.

U.S. Pat. No. 5,403,537 Method For Forming Composite Structures by E. C. Seal, et al. discloses a method wherein multiple layers of fibrous reinforcements are assembled into a desired configuration on a support tool, with one of the layers of fibrous reinforcement defining a resin carrier fabric (distribution medium) that extends beyond the periphery of the other layers. The layers of fibrous reinforcements and tool are covered with a flexible layer to form an envelope that encapsulates the fibrous reinforcements. A vacuum source evacuates air from the envelope. Resin is introduced into the envelope and fibrous reinforcements by using a flow path through the one layer used as the resin carrier layer. After the fibrous reinforcements have been impregnated, the resin flow is terminated and the resin is cured. What is really happening is that an additional fibrous layer is added to the fiber reinforcements making up the part that extends there beyond and over flow channels at the periphery of the tool. In one embodiment, this extra fibrous layer is separated from the "part" by a release or peel ply. In a second embodiment, the fibrous layer is integral with the part. This distribution medium is designed for use in a process where the resin is introduced from the peripheral edges of the lay-up.

U.S. Pat. No. 6,048,488 One Step Resin Transfer Of Multifunctional Composites Consisting Of Multiple Resins by B. K. Fink, et al. discloses a system wherein a pair of preforms with different permeabilities are installed in a mold separated by a separation layer. Different resins are injected into each preform by the vacuum assisted resin transfer method. The trick to making this process work is the use of a separation layer having permeability lower than the permeability of either of the fiber preforms.

The FASTRAC System developed by the US Army Research Laboratory is also of interest. FASTRAC uses a dual bag with in a bag concept. Both bags are sealed to the mold surface with the lay-up within the inner bag. The outer bag incorporates protrusions. A vacuum is first drawn from between the inner and outer bag. This forces the protrusions into the inner bag creating a pattern of channels. A vacuum is then drawn from between the mold surface and inner bag. Resin is then flowed into the lay-up through the channels. Thus the inner bag acts as a resin distribution medium. This apparatus requires a custom vacuum bag, which may raise fabrication costs.

Thus, it is a primary object of the invention to provide an apparatus for fabricating composite parts by the VARTM process.

It is another primary object of the invention to provide an apparatus for fabricating composite parts by the VARTM process that produces parts at a lower cost.

It is another primary object of the invention to provide an apparatus for fabricating composite parts by the VARTM process using an improved resin distribution system.

It is a further object of the invention to provide an improved resin distribution system for the VARTM process.

It is a still further object of the invention to provide an improved resin distribution system for the VARTM process that uses readily available materials.

SUMMARY OF THE INVENTION

The invention is a method for fabricating fiber reinforced plastic structures In detail, the apparatus includes a fluid impervious outer sheet having a resin inlet port. A mold is included having a surface upon which can be supported a lay-up of one or more layers of a fibrous material, and over which can be placed the fluid impervious outer sheet with its edges marginally sealed upon the mold surface to form a chamber. A vacuum outlet port is provided for drawing a vacuum upon the chamber. A resin distribution system is located between the lay-up and the fluid impervious sheet, which includes a resin distribution medium for receiving resin from the resin inlet port and a resin containment layer between the resin distribution medium and the lay-up. The resin containment layer prevents resin flowing from the resin distribution medium into the lay-up until the resin distribution medium is substantially filled with resin.

The resin containment layer can comprise a layer of adhesive having a melting point below the curing temperature of the resin, such that the resin can be flowed into the resin distribution medium from the inlet port filling same and will melt upon heating of the resin to curing temperatures allowing the resin to flow through the distribution medium. A second version of the containment layer comprises a layer of perforated heat shrinkable material having a plurality of holes there through. The holes have a size such that resin will not readily flow there through at ambient temperatures and upon heating toward the resin curing temperature, the layer shrinks causing the holes to increase in size allowing resin to flow from the resin distribution medium to the lay-up.

A third version of the containment layer comprises a layer of material having a plurality of holes there through, with the holes having a size such that that resin will not flow there through if a vacuum is drawn to the outlet port at a first rate and will flow there through when a vacuum is drawn from the outlet port at a higher second rate. A peel ply porous to resin is sometimes positioned between the containment layer and the lay-up and the lay-up and mold surface.

In detail, the method of forming fiber reinforced plastic structures comprising the steps of:

Placing fibrous material on a mold surface creating a lay-up.

Placing a resin distribution medium over a resin containment layer.

Placing a fluid impervious outer sheet over the fibrous material and the resin distribution medium and sealing the marginal edges thereof to the mold surface thereby forming a chamber.

Introducing resin into the chamber.

Drawing a vacuum on the chamber;

Substantially preventing resin from entering the lay-up until the resin distribution medium is substantially filled with resin. This is accomplished by placing a resin containment layer between the resin distribution medium and lay-up.

Filling the resin distribution medium with resin.

After the resin distribution material is substantially filled with resin, allowing the resin to transfer from the distribution medium to the lay-up; and Curing the resin. This most often requires the resin to be heated.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of examples. It is to be expressly understood, however, that the drawings are for purposes of illustration and description only and are not intended as a definition of the limits of the invention.

BRIEF DESCRIPTION OF THE DRAWINGS

FIG. 1 is a cross-sectional view of the apparatus for forming composite parts.

FIG. 2 is an exploded perspective view of the apparatus illustrated in FIG 1.

DESCRIPTION OF THE PREFERRED EMBODIMENT

Figure 3:
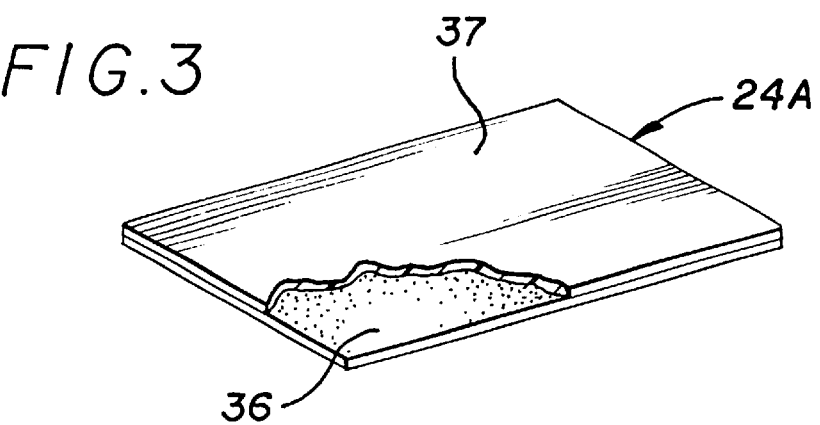
FIG. 3 is an enlarged perspective view of a first embodiment of the containment layer, wherein the containment layer is made of adhesive.

Referring to FIGS. 1 and 2, the apparatus, generally indicated by numeral 10, includes a mold 12 having a mold surface 14. For purposes of illustration a flat mold surface 14 is shown, however, the mold surface could have a curved shape. Fibrous material, such as woven fiberglass, graphite or other composite reinforcement material is laid-up on the mold surface 14 to form what is commonly called a "lay-up" or "preform" 16 made up of layers 16A, 16B, 16C and 16D. A peel ply 18A and 18B are sometimes required to be positioned on either side of the lay-up 16. The peel plies 18A and 18B are typically made of a material such as a porous TEFLON-coated fiberglass, which is porous so that the resin can easily pass through and does not bond to the mold surface 14 or lay-up 16 as the resin cures. A suitable peel ply material is Release Ease 234TFP, manufactured by Airtech Products, Incorporated, Huntington Beach, Calif.

Placed on top of the peel ply 18B is a resin distribution system 20 comprising a resin distribution medium 22 and resin containment layer 24, both of which will be subsequently discussed in detail. An impervious sheet 26, commonly called a vacuum bag, having a resin inlet port 28 is placed over the assembled lay-up 16, peel plies 18A and 18B, and resin distribution system 20 and sealed at its marginal edges 30 to the mold surface 14 by means of a sealant tape 32 forming a chamber 34. A suitable sealant type is Tacky Tape™ manufactured by Schnee-Moorehead, Irving, Tex. A vacuum port 35 is installed between the mold surface 14 and marginal edge 30 of the impervious sheet 26.

A preferred material for the impervious sheet 26 is impregnated Nylon, which can be obtained from numerous suppliers such as the previously mentioned Airtech Products. The resin distribution medium 22 can be any of the prior art concepts previously discussed, however, it is preferred that a knitted mono-filament UV stabilized high density polyethylene is used. For example, SolarGuard™ manufactured by Roxford Fordell Company, Greenville, S.C. Anther suitable product is Colbond 7004 manufactured by Colbond, Incorporated, Enka, N.C. Colbond 7004 is a random orientated, heat fused mono-filament material. It should be pointed out the use of the mold 14, peel plies 18A and 18B, resin distribution medium 22, and impervious sheet 26 are all old in the art. The novel feature is the use of the containment layer 24 in combination with the resin distribution medium 22. In operation, resin is flowed into the inlet port 28, while a vacuum is drawn from the outlet port 34. This causes the impervious sheet to collapse down around the distribution medium 22. If there were no distribution medium 22, the resin would have a difficult time completely filling the lay-up 16 and resin starved area or even voids would likely exist in the completed composite structure. However, with a resin distribution medium 22, the resin flows therein and easily spreads over the entire surface of the lay-up 16 greatly reducing the chance of voids and the like.

The resin containment layer 24 is designed to insure that the resin distribution medium 22 is substantially filled throughout with resin prior to the resin entering the lay-up 16. The resin containment layer 24 can comprise a number of different concepts. One preferred concept is illustrated in FIG. 3 wherein the resin containment layer is a sheet of adhesive 24A having a melting point lower than the curing temperature of the resin used to impregnate the lay-up 16. A suitable sheet of adhesive 24A is Blue Max Tak Tu on Reemay (a polyester non-woven veil) Manufactured by The Blue Max Company, Anaheim, Calif. It is a low temperature melting resin 36 that is applied to a very porous veil material 37.

Figure 4:
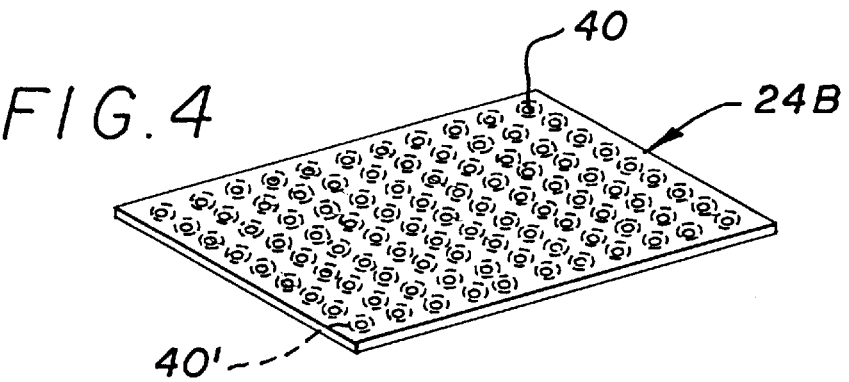
FIG. 4 is an enlarged perspective view of a second embodiment of the containment layer, wherein the containment layer is made of a perforated heat shrinkable material.

Referring to FIG. 4, another preferred resin containment layer 24 is a sheet of heat shrinkable material 24B having a plurality of holes 40 there through. A suitable heat shrinkable material is Intercept Shrink film manufactured by FPM, Incorporated, Brownstone, Me. When the apparatus 10 is heated to curing temperatures, the sheet 24B will shrink and the holes 40 will greatly increase in size, shown in dotted lines and indicated by numeral 40'.

Figure 5:
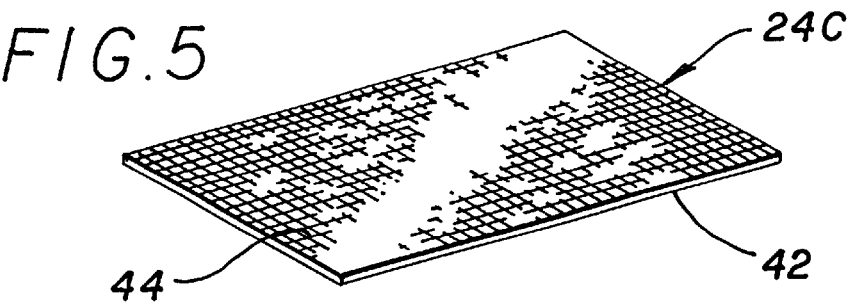
FIG. 5 is an enlarged perspective view of a third embodiment of the containment layer, wherein the containment layer is made of a highly perforated material.
Figure 5A:
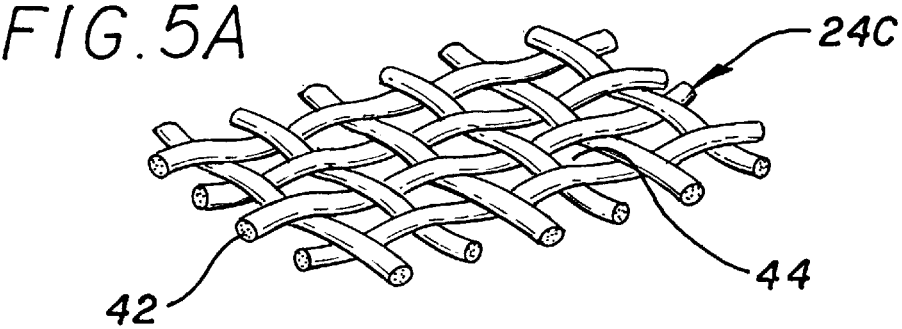
FIG. 5A is partial enlarged view of FIG. 5

Another approach to the design of the containment layer is illustrated in FIG. 5 and 5A, and indicated by numeral 24C. The containment layer 24C is a porous film 42 having very closely spaced perforations 44 is used. The size of the perforations is selected to prevent or greatly reduce resin flow through the containment layer. Calculating the resin containment layer 24C perforation size can be easily accomplished. For a layer of resin above the resin containment layer 24C, the hydrostatic pressure at the layer is by the equation:

$$PH = \rho hg$$

Where: $\rho$ is the density of the resin, h is the depth (height) of the resin, and g is the gravitational constant The "excess pressure" developed by the surface tension of the resin and the openings (perforations) in the resin containment layer 24C can be expressed as:

$$PE = 2T/d$$

where T is the surface tension of the resin and d is the perforation diameter (assumes circular perforation)

The governing equation for resin containment sets the hydrostatic pressure equal to the excess pressure:

$$\rho hg = 2T/d$$

Typical resin properties are:

$\rho = 1265$ kg/m3 (Ref. Composite Airframe Structures, Niu)

$T = 0.032$ N/m (Ref. msu.edu for Derakane 411 C-50)

The maximum perforation size that overcomes the hydrostatic pressure is then:

$d = 2T/((hg) = 2 (0.032)/(1265 \times h \times 9.8)$ $d = 0.000005163/h$ meters Using a typical thickness of a resin distribution medium, the resin height becomes 0.00635 m (0.25 in) and the maximum perforation size is:

$$d_{max} = 8.13 \times 10^{-4} \text{ meters } (0.032 \text{ in})$$

For thicker resin distribution mediums, the maximum perforation size will decrease. Perforations larger than this maximum value will not contain the resin during infusion. Similarly, the minimum perforation size can be estimated by equating the excess pressure to the sum of the hydrostatic pressure and the vacuum pressure in the bagged assembly:

$$\rho hg + PV = 2T/d$$

where PV will be on the order of one atmosphere. At sea level, PV is approximately 100 kPa and dominates the left side of the equation above. The minimum perforation size is then estimated by:

$$d_{min} = 2T/PV = 2(0.032)/(100 \times 10^3)$$

$$d_{min} = 6.4 \times 10^{-7} \text{ meters } (2.5 \times 10^{-5} \text{ in})$$

Perforations smaller than this minimum value will not permit resin to pass through the resin containment layer 24C under vacuum pressure. The resin containment layer 24C perforation size is then bounded by:

$$2.5 \times 10^{-5} \text{ in} < d < 0.032 \text{ in}$$

A suitable material for the containment layer 24C is Easy Gardner Tree Wrap having round holes with a 0.015 in diameter or Easy Gardner Weed Block with square holes of a similar size. Both of these materials are manufactured by Easy Gardner, Incorporated, Waco, Tex. This method of calculation can be used to design the perforations in the containment layer 24B made of heat shrinkable material.

While the invention has been described with reference to particular embodiments, it should be understood that the embodiments are merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to industries manufacturing composite structures.

What is claimed is:

1. A method of forming reinforced plastic structures comprising the steps of:

placing fibrous material on a mold surface creating a lay-up;

placing a resin distribution medium over a resin containment layer;

placing a fluid impervious outer sheet over fibrous material and the resin distribution medium and sealing the marginal edges thereof to the mold surface thereby forming a chamber;

introducing resin into the chamber so that the resin flows over the resin distribution medium;

drawing a vacuum in the chamber;

substantially preventing the resin from entering the lay-up until the resin distribution medium is substantially filled with resin;

after the resin distribution medium is substantially filled with resin, allowing the resin to transfer from the resin distribution medium to the lay-up; and heating the resin to curing temperatures.

2. The method as set forth in claim 1 wherein said step of substantially preventing resin from entering the lay-up until the resin distribution medium is substantially filled with resin comprises the step of placing the resin containment layer between the resin distribution medium and the lay-up for preventing resin flowing from the resin distribution medium into the lay-up until the resin distribution medium is substantially filled with resin.

3. The method as set forth in claim 2 wherein the resin containment layer is a layer of adhesive bonded to the resin distribution medium, said layer of adhesive having a melting point below the curing temperature of the resin; such that the resin can be flowed into the resin distribution medium filling same and will melt upon heating of the resin to curing temperatures allowing the resin to flow through the lay-up.

4. The method as set forth in claim 2 wherein the resin containment layer is a heat shrinkable material having a plurality of holes there through, the holes having a size such that resin will not readily flow there through at ambient temperatures and upon heating toward the resin curing temperature, the heat shrinkable material shrinks causing the holes to increase in size allowing resin to flow from the resin distribution medium to the lay-up.

5. The method as set forth in claim 2 wherein the resin containment layer having a plurality of holes there through, the holes having a size such that the resin will not flow there through if a vacuum is drawn to an outlet port at a first rate and will flow there through when a vacuum is drawn from the outlet port at a higher second rate.

6. The method as set forth in claim 2, 3, 4, or 5, further comprising the step of placing a peel ply porous to resin positioned between the resin containment layer and the lay-up and between the lay-up and the mold surface.

7. A method of forming plastic structures comprising:

placing fibrous material on a mold surface creating a lay-up;

placing a resin distribution medium over a resin containment layer;

placing a fluid impervious outer sheet over the fibrous material and the resin distribution medium and sealing the marginal edges thereof to the mold surface thereby forming a chamber;

introducing resin into the chamber so that the resin flows over the resin distribution medium;

substantially preventing resin from entering the lay-up until the resin distribution medium is substantially filled with resin; and after the resin distribution medium is substantially filled with resin, allowing the resin to transfer from the resin distribution medium to the lay-up.

8. The method as set forth in claim 7 wherein substantially preventing resin from entering the lay-up comprises placing a resin containment layer between the resin distribution medium and the lay-up to prevent the resin flowing from the resin distribution medium into the lay-up until the resin distribution medium is substantially filled with resin.

9. The method as set forth in claim 8, further comprising drawing a vacuum in the chamber after introducing resin into the chamber.

10. The method as set forth in claim 8, further comprising heating the resin to curing temperatures.

11. The method as set forth in claim 9 wherein the resin containment layer includes a plurality of holes there through, the size of the holes being such that resin will not flow there through if a vacuum is drawn to an outlet port at a first rate and will flow there through when a vacuum is drawn from the outlet port at a higher second rate.

12. The method as set forth in claim 10 wherein the resin containment layer is a layer of adhesive bonded to the resin distribution medium, the layer of adhesive having a melting point below the curing temperature of the resin; such that the resin can flow into the resin distribution medium and the-layer of adhesive will melt when the resin is heated to curing temperatures.

13. The method as set forth in claim 10 wherein the resin containment layer is a heat shrinkable material having a plurality of holes there through, the holes having a size such that resin will not readily flow there through at ambient temperatures and upon heating toward the resin curing temperature, the heat shrinkable material shrinks causing the holes to increase in size allowing resin to flow from the resin distribution medium to the lay-up.

14. The method as set forth in claim 8 wherein the resin containment layer is selected from materials whose porosity properties change under at least one of the group of: application of different rates of vacuum, and varying heat.

15. The method as set forth in claim 14, further comprising placing a peel ply porous to resin between the resin containment layer and the lay-up, and between the lay-up and the mold surface.

* * * * *

UNITED STATES PATENT AND TRADEMARK OFFICE
Certificate

Patent No. 6,630,095 B2                                                                            Patented: October 7, 2003

On petition requesting issuance of a certificate for correction of inventorship pursuant to 35 U.S.C. 256, it has been found that the above identified patent, through error and without any deceptive intent, improperly sets forth the inventorship.
    Accordingly, it is hereby certified that the correct inventorship of this patent is: Steve Slaughter, Palmdale, CA (US); John C. Fish, Santa Clarita, CA (US); and Susan N. Clarkson, Newhall, CA (US).

Signed and Sealed this Twenty-second Day of April 2008.

CHRISTINA JOHNSON
                                                                                    *Supervisory Patent Examiner*
                                                                                             Art Unit 1791